J. Rogers,
Water Wheel.

No. 99,004.  Patented Jan. 18, 1870.

Witnesses:
Phil. T. Dodge,
E. J. Sommer.

Inventor:
John Rogers
by Dodge & Munn
his attys.

United States Patent Office.

JOHN ROGERS, OF ROGERSVILLE, PENNSYLVANIA.

Letters Patent No. 99,004, dated January 18, 1870.

IMPROVEMENT IN WATER-WHEELS.

The Schedule referred to in these Letters Patent and making part of the same.

*To all whom it may concern:*

Be it known that I, JOHN ROGERS, of Rogersville, in the county of Green, and State of Pennsylvania, have invented certain new and useful Improvements in Water-Wheels; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to turbine water-wheels, of that class which receive the water at their periphery, and discharge it below and at the centre; and It consists—

First, in the form of the wheel;

Second, in the manner of constructing the chutes, so as to yield, when obstructions of any kind enter them, and thus avoid breaking them or the wheel; and Third, in the manner of constructing and operating the gates, so that when sticks or other obstructions enter one of them, it will not prevent the rest from being closed.

In the drawings—

Figure 1 is a top plan view of the wheel complete, with the gates open;

Figure 2, the same, with the gates closed, except one, showing the manner in which that one yields to obstructions;

A is the wheel, consisting of a circular metal plate, attached to the vertical shaft B, and having secured to its under side the series of buckets $a$ $a$, which are also supported by the band or rim $b$, passing around their lower edges.

Figure 3:
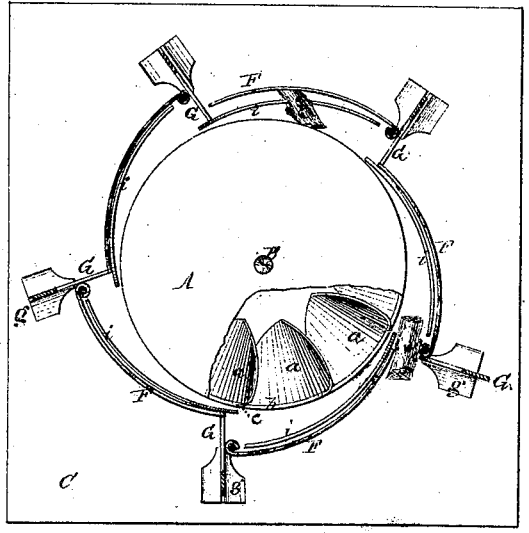
Figure 3 is a horizontal section on the line $x$–$x$ of fig. 4.
Figure 5:
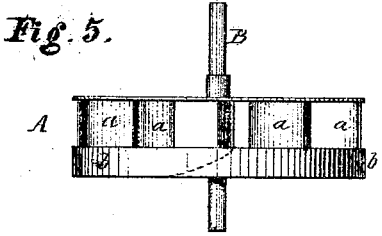
Figure 5 is a side elevation of the wheel, detached from its casing.

The form of the buckets $a$ is clearly shown in figs. 3 and 5, a portion of the plate being broken away in the former figure. The upper portion of each bucket stands vertically, or nearly so, and is curved horizontally, as shown in fig. 3, with a sharp flange or lip, $c$, turned forward on its outer edge. The lower portion, or that below the line of the upper edge of rim $b$, is inclined, as shown by dotted lines in fig. 5, and is also made slightly concave on its upper side.

This form of bucket I find to be highly advantageous, the water as it enters first takes hold upon the lip $c$, and aids the wheel, instead of expending its force upon the surrounding case. This lip then directs it inward against the vertical portion of the bucket, against which it expends its momentum, and then descends, by cause of gravity, acts upon the inclined portion, and passes out below.

C is a plate or bed, having a hole of just sufficient size to admit the wheel, and into which the wheel is placed, so that the upper edge of rim $b$ is flush with the upper side.

This bed has attached to its under side a cross-bar, D, to sustain the lower end of the shaft or spindle B, and to its upper side a plate or crown, E, to maintain the upper end of the shaft in position, and for other purposes hereinafter described.

F are the chutes, for directing the water against the wheel. They are placed between the plate E and the bed C, and have one end pivoted at some distance out from the wheel, and their loose ends turned inward, close to the same, as shown in fig. 3. In this manner, an opening for the entrance of water to the wheel is left between the inner end of one chute and the outer or fixed end of the next.

The chutes thus arranged may be turned around backward upon their pivots, when it is desired to examine or clean rubbish from the wheel, or when any solid body passes in with the water, between them and the wheel, they yield, and allow the body to pass, instead of wedging against or breaking the buckets.

The chutes are held in position by the pressure of the surrounding water in the flume or penstock, and to prevent them from being forced against the wheel, I secure to the bed C ribs or flanges $i$, against which they rest, as shown in fig. 3.

Figure 2:
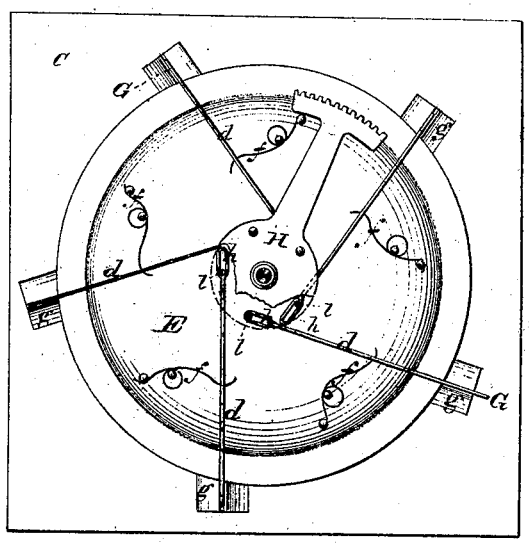
Figure 4:
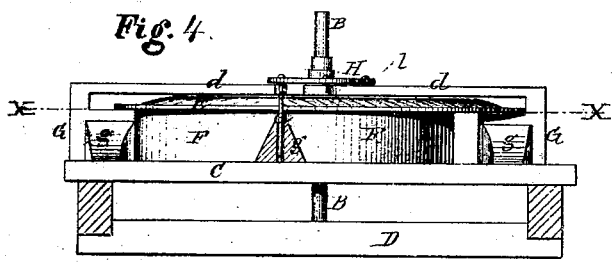
Figure 4 is a side elevation of the wheel complete.

G are the gates, sliding across the openings between the ends of the adjoining chutes, and guided in their movement by blocks $g$, as shown in figs. 2 and 3.

Figure 1:
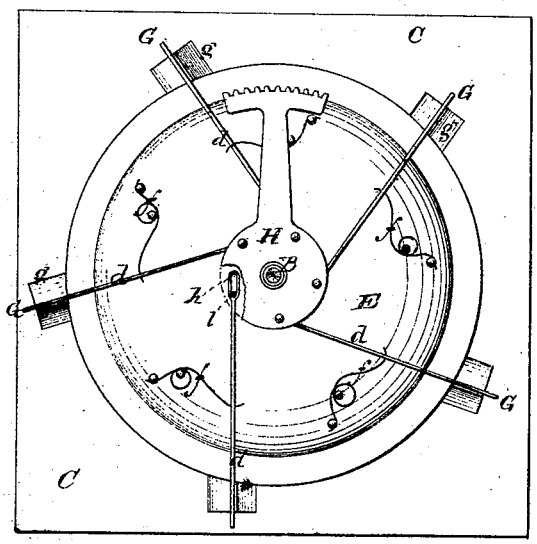

Each of the gates G, I form with an arm, $d$, which extends above the plate E, in to near the shaft B, and is slotted at its inner end, as shown in figs. 1 and 2.

H is an arm, turning loosely around shaft B, and formed at its inner end with a circular head, having on its under side pins or studs $l$, one of which enters each of the slots in arms $d$.

To each of the arms $d$, I connect one end of a spring, $f$, secured to plate E, these springs tending to keep the gates closed.

Upon turning the arm H to the right, the gates G are allowed to close, under the action of the springs $f$; but upon turning the arm H to the left, the pins $l$ are brought against the inner ends of the slots $h$, and the gates shoved open, so as to admit water within the chutes, against the wheel.

When it happens that one of the gates is obstructed by drift-wood or other matter, as shown in fig. 3, it does not prevent the remaining gates from closing, as the slot in its arm allows the pin to play, without the arm moving.

In this manner I produce a wheel, in which I realize nearly the full force of the water, which is strong and simple in construction, and in which the entry of drift-wood and similar foreign bodies cannot break or injure the wheel or case, nor the obstruction of one gate prevent the closing of the others.

I am aware that the ends of curbs for water-wheels have been provided with a single lip, hinged in such a way as to yield to the pressure of any obstruction against its inner side, but this I do not claim; but, having thus described my invention,

What I claim, is—

1. The wheel A, with its buckets $a$, provided with the lips $c$, and curved in both their vertical and horizontal planes, as herein shown and described.

2. The hinged water-directing chutes F and ribs $i$, constructed and arranged to operate as herein described and for the purpose set forth.

3. The gates G, provided with arms $d$ and slots $h$, in combination with arm H, springs $f$, and blocks $g$, constructed and arranged to operate substantially as and for the purposes set forth.

4. The combination of the wheel A, chutes F, gates G, and arm H, constructed and arranged to operate substantially as set forth.

JOHN ROGERS.

Witnesses:
  JOHN SELLERS,
  T. R. ROYERS.